United States Patent
Soucek et al.

(10) Patent No.: US 9,545,611 B2
(45) Date of Patent: Jan. 17, 2017

(54) MAGNETIC MACROINITIATORS AND MAGNETICALLY INDUCED CHAIN REACTIONS

(71) Applicants: Mark D Soucek, Akron, OH (US); Kent R Miller, Lexington, KY (US)

(72) Inventors: Mark D Soucek, Akron, OH (US); Kent R Miller, Lexington, KY (US)

(73) Assignee: The University of Akron, Akron, OH (US)

( * ) Notice: Subject to any disclaimer, the term of this patent is extended or adjusted under 35 U.S.C. 154(b) by 313 days.

(21) Appl. No.: 13/975,902

(22) Filed: Aug. 26, 2013

(65) Prior Publication Data

US 2014/0054162 A1    Feb. 27, 2014

Related U.S. Application Data

(60) Provisional application No. 61/692,997, filed on Aug. 24, 2012.

(51) Int. Cl.
*B01J 19/08*      (2006.01)
*C08F 2/46*      (2006.01)

(52) U.S. Cl.
CPC ............... *B01J 19/087* (2013.01); *C08F 2/46* (2013.01)

(58) Field of Classification Search
CPC ............... B01J 2219/0856; B01J 2219/0858; B01J 2219/086; B01J 2219/0862; B01J 2219/0864; B01J 2219/0866; B01J 2219/0867

(Continued)

(56) References Cited

U.S. PATENT DOCUMENTS 6,048,920 A * 4/2000 Ziolo et al. .................. 524/435
2004/0129555 A1 * 7/2004 Marchitto et al. ....... 204/157.15
(Continued)

FOREIGN PATENT DOCUMENTS

CN        101259435 A * 9/2008
WO      WO 8301738 A1 * 5/1983
WO    WO 2010120108 A2 * 10/2010

OTHER PUBLICATIONS

Liu et al, "Preparation of ellipsoidal hematite/polymer hybrid materials and the corresponding hollow polymer ellipsoids," Polymer 49 (2008) pp. 4776-4783.*

(Continued)

*Primary Examiner* — Edna Wong
*Assistant Examiner* — Colleen M Raphael
(74) *Attorney, Agent, or Firm* — Renner Kenner Greive Bobak Taylor & Weber

(57) ABSTRACT

This invention provides a method of initiating chain reaction in a chain reaction medium including (a) a macroinitiator and (b) chain reactants selected from monomers, reactive oligomers, reactive diluents and derivatives thereof and mixtures of the forgoing. The macroinitiator includes a multidentate anchor segment coordinated with a magnetic nanoparticle through more than one bond, and a chain reaction initiator segment bound to the multidentate anchor and providing a weak bond that can be cleaved to initiate a chain reaction. The method further comprises subjecting the chain reaction medium to an alternating current magnetic field to vibrate the magnetic nanoparticle and thereby cleave the weak bond, the cleavage resulting in the initiation of a chain reaction involving the chain reactants.

20 Claims, 6 Drawing Sheets

(58) Field of Classification Search
USPC .............................................. 204/155; 556/9
See application file for complete search history.

(56) References Cited

U.S. PATENT DOCUMENTS

| | | |
|---|---|---|
| 2005/0271745 A1* | 12/2005 | Gruettner et al. ............ 424/646 |
| 2009/0263331 A1* | 10/2009 | Wu et al. ................... 424/9.323 |
| 2010/0047578 A1* | 2/2010 | Lee ............................... 428/403 |
| 2012/0080637 A1* | 4/2012 | Herzog et al. ............. 252/62.54 |
| 2013/0112911 A1* | 5/2013 | Mazyar et al. ............ 252/62.54 |
| 2014/0044600 A1* | 2/2014 | McAlister .................... 422/128 |

OTHER PUBLICATIONS

Shukoor et al, "Fabrication of a Silica Coating on Magnetic γ-Fe2O3 Nanoparticles by an Immobilized Enzyme," Chem. Mater. vol. 20, No. 11, 2008, pp. 3567-3573.*

Frickel et al, "Functional Silanes as Surface Modifying Primers for the Preparation of Highly Stable and Well-Defined Magnetic Polymer Hybrids," Langmuir, 2010, vol. 26, No. 4 pp. 2839-2846.*

* cited by examiner

MAGNETIC MACROINITIATORS AND MAGNETICALLY INDUCED CHAIN REACTIONS

CROSS-REFERENCE TO RELATED APPLICATIONS

The present application claims the benefit of U.S. Provisional Patent Application No. 61/692,997, filed Aug. 24, 2012, incorporated herein by reference.

FIELD OF THE INVENTION

The present invention generally relates to macroinitiators. More particularly, the present invention relates to magnetic macroinitiators based on magnetic nanoparticles and methods of employing same in initiating a chain reaction.

BACKGROUND OF THE INVENTION

Magnetic nanoparticles (MNs) are interesting because the magnetic properties they display are much different than that of the bulk material. MNs have a great potential to be used in applications such as magnetic ferrofluids, contrast agents for imaging, biomedical applications, and drug delivery. However, due to MN dipole-dipole attractions, MNs tend to aggregate. To help prevent aggregation, polymeric stabilizers are usually grafted onto the surface of the MNs. Hindering particle aggregation is important to preserve the magnetic properties of the particles as well as permitting a good dispersion of the particles in be obtained.

Polymers can be anchored to the surface of nanoparticles by: physisorption, where a weak bond is formed between the particle surface and the polymer; grating to technique, wherein a polymer end-group reacts with the particle surface and grafting from technique, which involves the growth of polymer chains from one end of the chain initiator anchored to the particle surface through chemisorption.

Out of these three methods, the grafting from technique gives the highest grafting density because polymer chains are grown from small molecules reacting with the surface of the MN and the tethered polymer chains are forced to stretch away from the surface. In using the "grafting from" method, macro-initiators (MIs) are produced for the grafting of initiators onto the surface of the MNs. Atom transfer radical polymerization (ATRP) initiators are commonly used because narrow polydispersed polymers can be obtained with relatively low radical concentration. Anchoring moieties that have been used to graft ATRP initiators to magnetic nanoparticles include, but are not limited to: phosphonate (—PH(OH)2), chlorosilane (—SiCl3), carboxylic acid group (COOH). In addition, peroxide based and azo compounds have been grafted onto MNs in order to create a polymer shell via the polymerization of vinyl monomers.

In the production of magnetic macro-initiators, magnetite has almost exclusively been used as the magnetic core, limiting the magnetic properties that can be achieved by use of different magnetic cores. In addition, the synthesis of magnetic MIs has mainly focused on the production of a polymer shell surrounding the MI. Thus, there is a need in the art to produce magnetic macro-initiators that possess different magnetic properties such that the particles can be matched to an end application. Furthermore, the art would benefit from the production of stable magnetic MIs that are capable of forming networks within a polymeric system during polymerization thereby imparting magnetic properties into non-magnetic polymer materials.

The magnetic initiators disclosed herein will be useful in the generation of chain reactions, including particularly the formation of polymers and crosslinking of systems through the generation of free radicals. The most important part in free radical polymerization is activation of the initiator, i.e., the formation of a free radical. Initiation is most commonly achieved by thermal or radiation curing. Thermal curing can be accomplished by directly cleaving a bond at high temperatures or at lower temperature by use of thermal initiators. Whether or not thermal curing can be employed is highly dependent on the heat sensitivity of the substrate. Radiation curing has the advantage of a close to ambient temperature cure and can be accomplished by means of many different radiation sources, the most prominent being ultraviolet (IN) and electron beam (EB). In UV curing, photoinitiators are decomposed into free radicals which initiate the polymerization process, while in EB curing, monomers are directly excited by the high energy beam. Both UV and EB curing can be used on a much broader selection of substrates as opposed to thermal curing. However, these are not without their drawbacks. UV curing cannot be performed on heavily pigmented films because the pigments contained within the film can absorb or scatter the incoming radiation, causing the intensity of the UV rays propagating through the film to continually decease with depth. However, the decrease in radiation intensity due to pigment is not experienced with EB curing. Even so, this advantage comes with a higher safety concern which requires extensive safety equipment and measures. Although UV and EB curing may have different radical producing mechanisms, each shares one major flaw: in order for proper and uniform curing to take place, radiation needs to be distributed evenly throughout material. Consequently, these methods are usually limited to parts that can be easily manipulated around a radiation source allowing for uniform coverage.

Thus the art would further benefit from a new initiation method achieving chain reactions without the use of heat or application or radiation.

Previous work on magnetically cured systems have all focused on the generation of thermal heat throughout the bulk of an adhesive or composite via vibration of magnetic nanoparticles contained in the material. Heat is generated internally by means of vibrating magnetic particles embedded in the adhesive. The vibrations arise due to the application of an AC MF. When the field is on, the magnetic particles align themselves parallel to the applied MF and then reorganize into a disordered state once the field is switched off. The vibrations of the magnetic particles allow heat to be built up using a high frequency. The drawback of this curing method is that the large amount of generated heat precludes curing on heat sensitive substrates. Distinct from these methods, the method of the present invention provides for the initiation of free radicals via the vibration of magnet MIs without the generation of deleterious heat.

SUMMARY OF THE INVENTION

A first embodiment of this invention provides a method of initiating chain reaction comprising providing a chain reaction medium including (a) a macroinitiator and (b) chain reactants selected from monomers, reactive oligomers, reactive diluents and derivatives thereof and mixtures of the forgoing. The macroinitiator includes: a multidentate anchor segment coordinated with a magnetic nanoparticle through more than one bond, and a chain reaction initiator segment bound to the multidentate anchor and providing a weak bond that can be cleaved to initiate a chain reaction. The method further comprises subjecting the chain reaction medium to an alternating current magnetic field to vibrate the magnetic nanoparticle and thereby cleave the weak bond, the cleavage resulting in the initiation of a chain reaction involving the chain reactants.

A second embodiment provides a method as in the first embodiment, wherein the magnetic nanoparticle is formed from ferromagnetic materials.

A third embodiment provides a method as in either the first or second embodiment, wherein the magnetic nanoparticle is selected from magnetite, iron, cobalt, and iron-cobalt complexes.

A fourth embodiment provides a method as in any of the first through third embodiments, wherein the magnetic nanoparticle has a diameter of less than 250 nm.

A fifth embodiment provides a method as in any of the first through fourth embodiments, wherein the multidentate anchor segment is formed from a multidentate anchor compound by coordinating the multidentate anchor compound to the magnetic nanoparticle.

A sixth embodiment provides a method as in any of the first through fifth embodiments, wherein the multidentate anchor compound is selected from alkoxysilane coupling agents.

A seventh embodiment provides a method as in any of the first through sixth embodiments, wherein the multidentate alkoxysilane coupling agents are selected from dimethoxysilanes, trimethoxysilanes, diethoxysilane, triethoxysilane.

An eighth embodiment provides a method as in any of the first through seventh embodiments, wherein the multidentate anchor compound is biocompatible.

A ninth embodiment provides a method as in any of the first through eighth embodiments, wherein the chain reaction initiator segment is formed from a chain reaction initiator compound by binding the chain reaction initiator compound to the multidentate anchor segment or the multidentate anchor compound.

A tenth embodiment provides a method as in any of the first through ninth embodiments, wherein the chain reaction initiator compound is selected from azo compounds, peroxides and derivatives thereof and mixtures of the forgoing.

An eleventh embodiment provides a method as in any of the first through tenth embodiments, wherein the chain reaction initiator compound is an azo compound selected from 4,4'-azobis(4-cyanovaleric acid) and azobisisobutyronitrile (AIBN) and derivatives thereof and mixtures of the forgoing.

A twelfth embodiment provides a method as in any of the first through eleventh embodiments, wherein the chain reaction initiator compound is a peroxide compound selected from di-tert-butyl peroxide, benzoyl peroxide, methyl ethyl ketone peroxide, acetone peroxide, and derivatives thereof and mixtures of the forgoing A thirteenth embodiment provides a method as in any of the first through twelfth embodiments, wherein the weak bond provided by the chain reaction initiator segment has a bond strength of 65 kcal/mol or less.

A fourteenth embodiment provides a method as in any of the first through thirteenth embodiments, wherein the chain reactants are selected from multifunctional vinyl reactive diluents, vinyl-containing monomers and reactive oligomers, wherein the reactive oligomers have chain end vinyl functionality (telechelic) or internal vinyl functionality or pendant vinyl functionality.

A fifteenth embodiment provides a method as in any of the first through fourteenth embodiments, wherein the chain reactants include vinyl-containing monomers selected from acrylates, methacrylates and styrene and derivatives thereof and mixtures of the foregoing, and the chain reaction involves polymerization of the vinyl-containing monomers.

A sixteenth embodiment provides a method as in any of the first through fifteenth embodiments, wherein the chain reaction medium further includes one or more of solvents, curing agents, and sulfur-containing compounds.

A seventeenth embodiment provides a method as in any of the first through sixteenth embodiments, wherein, in said step of subjecting the chain reaction medium to an alternating current magnetic field, bond cleavage of the weak bond is achieved without the generation of heat sufficient to cause thermal decomposition of the weak bond.

An eighteenth embodiment provides a method as in any of the first through seventeenth embodiments, wherein, in said step of subjecting the chain reaction medium to an alternating current magnetic field, the temperature of the chain reaction medium stays below a thermal decomposition temperature of the weak bond.

A nineteenth embodiment of this invention provides an initiator for chain reactions comprising: a magnetic nanoparticle core; an anchor segment coordinated with said magnetic nanoparticle core through more than one bonded atom; and a chain reaction initiator segment linked to said anchor segment, wherein the magnetic nanoparticle core is selected from magnetite, iron, cobalt, and iron-cobalt complexes, the anchor segment is formed from alkoxysilane coupling agents and the chain reaction initiator segment is formed from 4,4'-azobis(4-cyanovaleric acid) and azobisisobutyronitrile (AIBN) and derivatives thereof.

A twentieth embodiment provides an initiator as in the nineteenth embodiment, wherein the magnetic core is selected from Co, FeCo, $Fe_3O_4$ and alkoxysilane coupling agent is (3-aminopropyl)triethoxysilane and the chain reaction initiator segment is formed from 4,4'-axobis(4-cyanovaleric acid).

DETAILED DESCRIPTION OF ILLUSTRATIVE EMBODIMENTS

Figure 1:
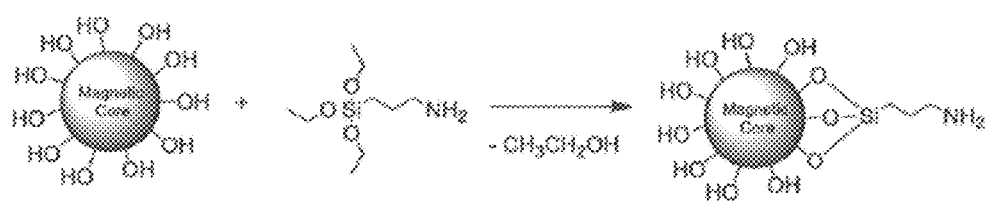
FIG. 1 is a scheme of the modification of magnetic nanoparticles with APTS.

The present invention provides magnetic macroinitiators and methods of employing the same to generate chain reactions. The magnetic macroinitiators include a magnetic nanoparticle (MN) core having a multidentate anchor segment bound thereto, and a chain reaction initiator segment connected to the anchor. The chain reaction initiator segment includes a weak bond that can be cleaved to initiate a chain reaction. Because the macroinitiators are formed of magnetic nanoparticles, they can be influenced by the application of an alternating current magnetic field (AC MF) to vibrate the magnetic nanoparticle. The energy from the vibration of the magnetic nanoparticle core is transferred through the anchor segment to the weak bond and ultimately leads to cleavage of the weak bond. Once bond cleavage takes place, a radical is formed that can initiate a chain reaction. By employing an AC MF, bond cleavage can be achieved at low temperatures, and notably temperatures lower than common thermal decomposition temperatures required to achieve bond cleavage at the weak bond. Thus, the present MIs and methods of generating chain reactions can be employed in systems wherein the surrounding medium is heat sensitive, such as in biomedical applications where high heat can negatively affect surrounding tissue. Because initiation is achieved through the application of an AC MF, the initiation of the chain reaction is not limited to the ability of light to penetrate the system, as in photoinitiation, and the initiation can also be achieved in enclosed areas because, depending upon the magnetic field strength, the magnetic flux can pass through many types of substrates.

The magnetic nanoparticles (MNs) are chosen from any ferromagnetic material. The MNs are of nanoscale dimensions. In some embodiments, the MNs have diameters of less than 1000 nm, in other embodiments, less than 500 nm, in other embodiments, less than 250 nm and in other embodiments, less than 100 nm. In some embodiments, the MNs have diameters of from 1 to 1000 nm, in other embodiments, from 1 to 500 nm, in other embodiments, from 1 to 250 nm, and in other embodiments from 1 to 100 nm.

MNs can be obtained commercially or formed through any technique known or hereafter developed. In some embodiments, the MNs are formed through methods selected from co-precipitation methods and reduction methods. In some embodiments, the MNs are selected from magnetite and iron cobalt, and are formed through co-precipitation methods. In some embodiments, the MNs are cobalt, and are formed through reduction methods. In some embodiments, the MNs are selected from magnetite, iron, cobalt, and iron-cobalt complexes that are magnetically susceptible and mixtures thereof.

In some embodiments, the MNs are selected from magnetite ($Fe_3O_4$), iron cobalt (FeCo), and cobalt and mixtures thereof. In some embodiments, the MNs are magnetite. In some embodiments, the MNs are FeCo. In some embodiments, the MNs are cobalt.

The anchor segment is formed from an anchor compound chosen to coordinate with the MN core through more than one bonded atom, i.e., a multidentate anchor compound. The multidentate anchor compound is further chosen to be capable of having the desire chain reaction initiator segment bound thereto. The anchor segment serves as a hard segment capable of transmitting vibration energy from the MN core to the chain reaction initiator segment, affecting particularly the weak bond thereof.

In some embodiments, the anchor segment is biocompatible and its modification of the MN also serves to avoid exposure of the MN core to biological systems where toxicity may be of concern.

Suitable anchor compounds will be apparent to those of ordinary skill in the art based on the choice of MN and the desired subsequent reaction with a chain reaction initiator compound (described more fully below). Known coordination chemistry is employed to secure the anchor segment to the MN. And known techniques is employed to react the desired chain reaction initiator compound with the anchor segment or anchor compound (again, described more fully below). That is, those of skill in the art can, without undue experimentation, choose a suitable anchor compound and methodology for its coordination to the MN to form the macroinitiator. Examples are provided in the Experimental section hereinbelow.

In some embodiments, the anchor compound can be selected from any coupling agent having functionality suitable to coordinate with the MN and link to the chain reaction initiator segment. In some embodiments, the anchor compound is selected from alkoxysilane coupling agents. Other coupling agents can also be used. As long as the coupling agents have functionality to attach to both the magnetic particle and link to the initiator. A mixture of such coupling agents may also be used.

In some embodiments, the anchor compound is an alkoxysilane and is selected from dimethoxysilanes, trimethoxysilanes, diethoxysilane, triethoxysilane and derivatives thereof and mixtures of the foregoing. In some embodiments, the anchor compound is biocompatible and is selected from (3-aminopropyl)triethoxysilane (ATPS) and derivatives thereof.

The anchor compound will further be chosen to have a suitable reactive group for reacting with a chosen chain reaction initiator compound, now disclosed below.

The chain reaction initiator segment is formed from a chain reaction initiator compound (herein after "initiator compound") that is bonded to the anchor segment. It may be bound to the anchor compound prior to coordination of the anchor compound with the MN to form the anchor segment or it may be bound the anchor segment after coordination of the anchor compound with the MN. The initiator compound is also chosen to provide a weak bond that can be cleaved through either homolytic or heterolytic fragmentation to generate a chain reaction. In a particular method taught herein, the weak bond is fragmented by the application of an AC MF causing vibration of the MN core and the transfer of energy to the weak bond through the anchor segment. The transmittance of energy from the vibrating magnetic core to the weak bond results in bond cleavage that leads to chain reaction initiation. The bond cleavage may provide a free radical or anionic or cationic species that initiates a chain reaction with additional chain reactive reagents present in a chain reaction medium (disclosed more fully below).

Suitable initiator compounds will be apparent to those of ordinary skill in the art based on the choice of the anchor compound. As noted above, the anchor compound is chosen to have an appropriate reactive group for reacting with the initiator compound. Various know techniques may be employed to bind the initiator compound to the anchor segment (post coordination with MN) or anchor compound (prior to coordination with MN). That is, those of skill in the art can, without undue experimentation, choose a suitable initiator compound and methodology for binding it to a given anchor to form the macroinitiator. Examples are provided in the Experimental section hereinbelow In some embodiments, the chain reaction initiator compound has a weak bond having a bond strength of 70 kcal/mol or less. In other embodiments, the chain reaction initiator compound has a weak bond having a bond strength of 65 kcal/mol or less, in other embodiments, 60 kcal/mol or less, in other embodiments, 55 kcal/mol or less and in other embodiments, 50 kcal/mol or less, and in some embodiments, 45 kcal/mol or less. In some embodiments, the chain reaction initiator compound has a weak bond having a bond strength of 40 or more to 70 or less kcal/mol. In some embodiments, the chain reaction initiator compound has a weak bond having a bond strength of 50 or more to 65 or less kcal/mol, and in some embodiments, 50 or more to 60 or less.

In some embodiments, the chain reaction initiator compound is selected from azo compounds and peroxides and derivatives thereof and mixtures of the forgoing. In the case of azo compounds, the weak bond is the C—N portion of the C—N═N unit, where the carbon of the C—N portion is the carbon close to the magnetic nanoparticle. In the case of peroxides, the weak bond is the O—O bond.

In some embodiments, the chain reaction initiator compound is a azo compound selected from 4,4'-azobis(4-cyanovaleric acid) and azobisisobutyronitrile (AIBN) and derivatives thereof and mixtures of the forgoing. In some embodiments, the chain reaction initiator compound is 4,4'-azobis(4-cyanovaleric acid) and derivatives thereof and mixtures of the forgoing.

In some embodiments, the chain reaction initiator compound is a peroxide compound selected from di-tert-butyl peroxide, benzoyl peroxide, methyl ethyl ketone peroxide, acetone peroxide, and derivatives thereof and mixtures of the forgoing.

In a method of this invention, macroinitiators such as those described above are magnetically induced to cause a chain reaction. While the chain reaction initiator segments disclosed above may be caused to fragment by the application of heat sufficient to cause thermal decomposition of the weak bond, the present invention achieves bond cleavage and thus chain reaction initiation by the application of an alternating current magnetic field (AC MF), without the generation of heat sufficient to cause thermal decomposition. This will find use in applications wherein any part of the system is heat sensitive. Additionally, if the magnetic field strength is of sufficient magnitude, the magnetic flux can pass through many types of substrates, and, thus, initiation can be achieved in enclosed areas. This is notable when comparing the present method to that of photoinitiation, in that the present method can be initiated in oqaque systems wherein light cannot sufficiently penetrate the system.

In the present method, a chain reaction medium is exposed to an alternating current magnetic field such that the magnetic field varies in direction and intensity. The chain reaction medium includes magnetic macroinitiators as disclosed above and chain reactants selected from monomers, reactive oligomers, reactive diluents and derivatives thereof and mixtures of the forgoing. The monomers, reactive oligomers and reactive diluents may be chosen from virtually any monomer, reactive oligomer and reactive diluent that is capable of participating in the chain reaction initiated by the cleavage of the weak bond of the magnetic macroinitiator.

In some embodiments, the chain reactive medium includes chain reactants selected from vinyl-containing compounds. In some embodiments, the chain reactive medium includes chain reactants selected from multifunctional vinyl reactive diluents and monomers and reactive oligomers with chain end vinyl functionality (telechelic) or internal vinyl functionality or vinyl functionality pendent off the main polymer chain. In some embodiments, the chain reactants include vinyl-containing monomers. In some embodiments, the monomers are selected from acrylates, methacrylates, styrene, polyesters and derivatives thereof and mixtures of the foregoing. In some embodiments, the monomers are selected from acrylates, methacrylates and styrene and derivatives thereof and mixtures of the foregoing. In some embodiments, the chain reactants include unsaturated polyesters.

In some embodiments, the chain reaction medium may further include solvents, curing agents, and sulfur-containing compounds. The solvents provide a suitable medium for the chain reaction, and curing agents, if employed, can help crosslink the reaction product. Suitable choices of solvents and/or curing agents, if desired or necessary, will be within the knowledge of those of ordinary skill in the art and/or could be determined without undue experimentation. The sulfur-containing compounds are provided for free radical initiated thiol-ene reactions with the vinyl-containing compounds. The sulfur-containing compounds may be chosen according to the formula R—SH, as generally appreciated in thiol-ene chemistry. The thiol-ene reaction involves the addition of the S—H bond across the double bond of the vinyl-containing chain reactants The application of the AC MF will cause some increase in temperature of the chain reactive medium as the MN cores are vibrated. Thus, the higher the loading of the MIs, the more significant the increase in temperature. In systems where temperature increase is of concern, the loading will need to be appropriately controlled. In other embodiments, a high loading may be desirable, particularly where the MN imparts desired properties to the chain reaction product.

In some embodiments, the chain reaction medium includes 0.1 wt. % or greater MI. In other embodiments, the chain reaction medium includes 0.5 wt. % or greater MI, in other embodiments, 1 wt. % or greater, in other embodiments, 2.5 wt. % or greater, in other embodiments, 5 wt. % or greater, in other embodiments, 7.5 wt % or greater, in other embodiments, 10 wt. % or greater, in other embodiments, 15 wt. % or greater, in other embodiments, 20 wt. % or greater, in other embodiments, 25 wt % or greater and, in other embodiments, 30 wt % or greater. In some embodiments, the chain reaction medium includes 35 wt. % or less MI. In other embodiments, the chain reaction medium includes 30 wt. % or less MI, in other embodiments, 25 wt. % or less, in other embodiments, 20 wt. % or less, in other embodiments, 15 wt. % or less, in other embodiments, 10 wt % or less, in other embodiments, 7.5 wt. % or less, in other embodiments, 5 wt. % or less, in other embodiments, 2.5 wt. % or less, and, in other embodiments, 1 wt % or less.

The chain reaction medium containing magnetic MIs in accordance with this invention is exposed to an alternating current magnetic field to cleave the weak bond of the MI. The application of the AC MF will depend upon the chain reaction medium and the environment.

It will be appreciated that the weak bonds of the chain reaction initiator segment may be cleave through thermal decomposition with the application of sufficient heat. Notably, in some embodiments of the present invention, the application of the AC MF achieves bond cleavage and thus chain reaction without the generation of heat sufficient to cause thermal decomposition of the weak bond. For in vivo applications, the operating region of the electromagnet should be chosen such that the product of the magnetic field, H, and frequency, f, is below threshold value of $4.85 \times 10^8$ A $m^{-1}$ $S^{-1}$ allowable for humans. The frequency of alternating the magnetic field should be high to avoid aggregation of the MIs. The appropriate frequency can be experimentally determined.

With the application of the AC MF, the weak bonds of the MIs within the chain reaction medium will begin to cleave and initiate the chain reaction for which the chain reaction medium was designed.

The present invention provides new magnetic macroinitiators and a new method of initiating chain reactions. The macroinitiators can have a variety of magnetic nanoparticles, with the various types of nanoparticles providing their own particular properties to the end product. In some embodiments, the magnetic nanoparticles of the macroinitiators are bound within the end product and provide magnetic properties thereto.

Because of the ability to operate a parameters that are not harmful to the human body, this new form of initiation could be very beneficial in in vivo applications. For example, bone repair and bone regeneration. These methods will allow for the injection of a viscous polymeric solution into the area where the bone has been damaged. Polymerization can be then induced by an AC MF exterior to the body. The viscous fluid will then vitrify into a solid, giving rigidity to the broken or fractured bone.

In addition, MIs can be used to cure a variety of polymer systems that are difficult to initiate using present methods. Any polymer system that is in an enclosed area can be initiated; which is particularly important for encapsulation coatings for electronics. UV curable polymers have difficulties in shadow areas, which can occur in circuit boards or other objects with complex shapes, as well as systems that are highly filled or pigmented. It is envisioned that magnetic initiators will be able to cure more uniformly than UV curable polymers whether there are shadows or not. This is possible since, depending on the magnetic field strength, the magnetic flux can pass thorough many types of substrates.

In the Experimental section below, magnetically induced polymerization via the decomposition of a magnetic macroinitiator under the influence of an externally applied AC MF is shown to be possible. A minimum force of 62 kcal/mol·A applied to the core of the MI is required in order to decompose the C—N bond of the azo group, producing free radicals. All three of the tested magnetic MIs ($Fe_3O_4$, FeCo, and Co) are capable of initiating free radical polymerization of different acrylic systems with minor increases in temperature as compared to the thermal decomposition temperature of the azo group. Overall, free radical polymerization was successfully achieved through the use of novel magnetic initiation In light of the foregoing, it should be appreciated that the present invention significantly advances the art by providing magnetic macroinitiators and methods of inducing chain reactions that are improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims.

EXPERIMENTAL

Example 1

Synthesis and Characterization of Magnetic Macroinitiators

Materials

Iron(II) sulfate heptahydrate, iron(III) chloride hexahydrate, aml110nim hydroside solution 28% (w/w), cobalt(II) chloride hexahydrate, Sodium borohydride, (3-aminopropyl)triethoxysilane (APTS), citric acid monohydrate, ethanol (200 proof), potassium phosphate monobasic ~98%, sodium chloride, hydrochloric acid, N-(3-Dimethylaminopropyl)-N'-ethylcarbodiimide hydrochloride ~98.0%, 4,4' Azobis(4-cyanovaleric acid) ~98.0% (ACV), phosphate buffered saline (PBS), methylene chloride, and styrene were purchased form Sigma and used without further purification.

Synthesis of APTS Modified Magnetite Nanoparticles

Magnetite nanoparticles were synthesized by a coprecipitaion method. In a 100 mL three neck flask equipped with a mechanical stirrer were taken 0.675 mmol FeS04.7H20 and 1.35 mmol FeCl3.6H20 in 40 mL of deionized water. The mixture was stirred under nitrogen gas for 30 min. Magnetite nanoparticles were obtained by adding 12 mL 28% (w/w) NH4OH to the solution. Immediately following addition of NH4OH, a black precipitate formed. The solution was vigorously stirred under nitrogen for an additional 30 min. Next 0.9 mL APTS was added over a 10 min time period, followed by further stirring under nitrogen for 30 min. Particles were washed 5 times with deionized water by using magnetic separation.

Synthesis of APTS Modified FeCo Nanoparticles

FeCo nanoparticles were prepared by coprecipitation, method. To a 500 mL three necked flask equipped with a magnetic stirrer, 1.0 mmol FeCl3.6H2O and 1 mmol CoCl2.6H20 were added with 150 mL deionized water. Mixture stirred for 30 min under nitrogen. 1 mmol NaBH4 dissolved in 50 mL deionized water was added to the solution followed by stirring under nitrogen for 4 hrs. Next 2 mL of APTS was added and the mixture was stirred for 1 hour under nitrogen. The particles were washed with deionized water 5 times to remove residual Na and Cl ions using magnetic separation.

Synthesis of APTS Modified Cobalt Nanoparticles

Cobalt nanoparticles were synthesized by the reduction of $Co^{2+}$. To a 1 L three neck round bottom flask equipped with a magnetic stirrer and containing 100 mL deionized water were added 10 mmol NaBH4 and 0.005 mmol citric acid monohydrate. Solution was stirred under nitrogen for 30 min. Next, 1 mmol CoCl2.6H20 dissolved in 0.2 mL deionized water was added to the mixture, and a black precipitate immediately formed upon addition of the cobalt solution. Following 1 min of stirring, 500 mL of an ethanolic solution containing 350 µL APTS was added. After 15 min of stirring under nitrogen the particles were washed 5 times with ethanol by using magnetic separation.

Synthesis of Magnetic Macro-Initiators

Magnetic macroinitiators were synthesized by a coupling reaction with 4,4'-azobis(4-cyanovaleric acid) (ACV). The APTS modified MNs ($Fe_3O_4$, FeCo, or Co) were activated by sonication for 30 min in 20 mL of coupling buffer. Coupling buffer was a 0.01 M potassium phosphate, 0.15 M sodium chloride solution adjusted to pH 5.6 with hydrochloric acid. The MNs were then magnetically separated and resuspended in 4 mL of the coupling buffer. Next, 10 mL of a solution containing 8.6 mmol of N-(3-Dimethylaminopropyl)-N'-ethylcarbodiimide hydrochloride and 8.6 mmol of ACV in deionized water was added to the MNs suspension. Reaction mixture was shaken for 24 hours at room temperature in the absence of light. Magnetic macro-initiators were then magnetically separated and washed 3 times with distilled H2O using magnetic separation.

Characterization

FTIR spectra were measured on a Nicolet-380 spectrometer in the range of 4000 to 400 $cm^{-1}$. Absorbance spectra were acquired at 4 $cm^{-1}$ resolution and the signal was averaged over 32 scans. Samples were prepared by mixing a small amount of the dried MIs (1-5 mg) with dry KBr powder. The sample mixture was then pressed together with a bolt press to form a transparent disk.

Differential scanning calorimetry (OSC) traces were recorded on a T A instrument DSC Q200 model. All the samples were heated from −30 to 150° C. at a heating rate 5° C.·min$^{-1}$ under nitrogen atmosphere.

Thermogravimetric analysis (TGA) of the MIs was performed on a TA instrument TGA Q500 model. Samples were heated from 30 to 650° C. in air with a scan rate of 10° C.·min$^{-1}$.

Dynamic light scattering (DLS) was used to quantify the hydrodynamic diameters and particle size distribution of the MIs. Samples were prepared by suspending 1 mg of the MIs in 10 mL of deionized water. A 90 Plus Brookhaven DLS spectrophotometer equipped with a BI9000 correlator and a 30 mW red diode laser operating at 673 nm was used for the scattering experiments that were performed at room temperature, and the scattering intensity was recorded at 90°. The data was processed using multimodal size distribution analysis based on non-negatively constrained least squares. Each measurement was performed 5 times, 2 min per measurement, with the mean and standard deviation reported.

Scanning electron microscopy (SEM) (Hitachi 52150) was used to qualitatively evaluate the size and shape of the MIs. The SEM samples were prepared by suspending 1 mg of MIs in 10 mL of ethanol. Solution was dropped onto a stub and allowed to dry.

Stability of Magnetic Macro-Initiators in PBS Solution

The stability of the MIs was determined by monitoring the change in hydrodynamic diameter of the particles via DLS. Samples were prepared by suspending 1 mg of the MIs in 20 mL of a phosphate buffered saline (PBS) solution, pH 7.4. DLS measurements were recorded over a period of 10 days. Each measurement was performed 5 times, 2 min per measurement, with the mean and standard deviation reported.

Magnetic Properties

Magnetization curves at room temperature for the MIs were obtained on a Princeton Micromag 2900 alternating gradient magnetometer. Dried powder samples were suspended in glass capillary tubes (1.5 mm OD×4 mm long). Samples ran in triplicate, with the mean and standard deviation reported.

Polymerization of Styrene with Magnetic Macro-Initiators

Into a polymerization vial, magnetic macro-initiators and 5 g (0.048 mol) of styrene monomer were charged. Polymerization was carried out by immersing the vial in an oil bath at 80° C. for 5 hr. In addition, polymerization initiated by 2 wt. % (0.36 mmol) ACV was performed. The amount of magnetic macro-initiator added was determined from the grafting density such that the molar amount of ACV was constant for all reactions.

The residual monomer content was determined by gas chromatography (GC) analysis. The unreacted monomer was extracted by adding 2 mL of methylene chloride to the polymerized styrene and shaking for 1 hr. Next, a 1 mL aliquot was injected into a Varian CP-3800 gas chromatograph equipped with a VF-5 fused silica capillary column (30 m×0.25 i.d. mm, 0.25 μm film thickness, Varian, USA). The optimum column separation was obtained with an initial temperature of 100° C. and a ramp rate of 5° C./min to 150° C., followed by a ramp rate of 25° C./min to reach the final temperature. The final temperature was set to 200° C., which was held for 5 min so that all the components eluted out of the column. The carrier gas was hydrogen. Concentration was determined by comparing the area of the styrene peak to external standards. Styrene concentrations used for external standards include: 1, 2, 4, and 6 M (mol/L). Conversion of the polymerized styrene was calculated according to equation (1):

$$\text{Conversion (\%)} = \frac{M_T - M_R}{M_T} \times 100 \tag{1}$$

where MT is the total amount of monomer added and MR is the residual amount of monomer present after polymerization.

Results

Magnetic MIs were produced by grafting an azo-initiator onto silica modified magnetic cores of Fe3O4, FeCo, or Co. Silica was used in order to help stabilize the magnetic macro-initiators such that upon dispersion in a medium the particles would be stable until use. The different magnetic cores were chosen to produce magnetic macroinitiators with different magnetic properties.

Synthesis and Characterization

Magnetic particles were prepared by a coprecipitation or reduction route, represented in the reactions below. The particles were modified with APTS, FIG. 1. The APTS modified magnetic particles were then reacted with ACV in a coupling reaction, FIG. 2, to produce the magnetic MIs.

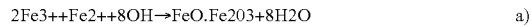

2Fe3++Fe2++8OH→FeO.Fe2O3+8H2O a)

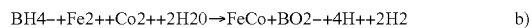

BH4−+Fe2++Co2++2H20→FeCo+BO2−+4H++2H2 b)

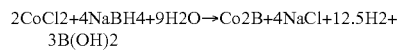

2CoCl2+4NaBH4+9H2O→Co2B+4NaCl+12.5H2+ 3B(OH)2

4Co2B+3O2→8Co+2B2O3 c)

Modification of the magnetic particles with APTS and subsequent grafting of ACV onto the particles was investigated with FTIR. The amine terminated nanoparticles had an absorption band at 572 cm$^{-1}$ due to the Fe—O bond. The absorption at 1090 cm$^{-1}$ was assigned to the C—N stretch of a primary amine which overlaps with the Si—O band at 1047 cm$^{-1}$. The magnetic initiator has absorption bands at 1630, 1652, 1710, and 2242 cm$^{-1}$, corresponding to N═N azo bond, C═O of amide group, C═O of carboxylic acid group, and cyanide group respectively. The absorption bands for the FeCo and Co particles grafted with ACV are shown in Table 1.

TABLE 1

FTIR Absorption Bands for APTS Modifeid, ACV Grafted FeCo and Co Particles

| Wave number | Assigned Bond | |
|---|---|---|
| (cm$^{-1}$) | FeCo | Co |
| 575 | Fe—O | — |
| 1047 | Si—O | Si—O |
| 1650 | C═O (amide group) | C═O (amide group) |
| 1710 | C═O (carboxylic acid) | C═O (carboxylic acid) |
| 1635 | N═N | N═N |
| 2240 | CN | CN |
| 2923 | C—H | C—H |

The MIs were further characterized by EDAX. All the graphs showed the presence of silica, oxygen, and carbon.

The main use for the EDAX analysis was to observe the metals that are contained in each MI. As expected, $Fe_3O_4$ MIs displayed a signal from iron, FeCo MIs produced both iron and cobalt signals, and the Co MIs displayed signals from cobalt. All MIs produced oxygen and silica signals due to APTS surface modification. Nitrogen and carbon signals are very weak and need to be in high abundance to have a noticeable signal and the ATPS modification and azo initiator grafting do not give a high enough abundance on nitrogen or carbon to produce a noticeable signal.

The grafting density of the attached azo initiator was determined by both DSC and TGA. In the DSC measurement, the exothermic decomposition of the azo initiator was monitored. The DSC traces confirmed that the grafting did not affect the thermal behavior of the initiator; all exotherm peaks were very close to the same temperature (ca. 126° C.).

Table 2 shows the calculated grafting densities by DSC for the $Fe_3O_4$, FeCo, and Co MIs.

For the determination of the grafting density by TGA, the weight loss of the APTS modified particles and the azo initiator grafted particles was monitored. To account for the decomposition of the APTS modification, the final weight loss was determined by subtracting the weight loss of the APTS modified particles from the weight loss of the azo initiator grafted particles. It was assumed the difference in weight loss was only from the attached azo initiator Table 2 shows the calculated grafting densities from the TGA measurements for the $Fe_3O_4$, FeCo, and Co MIs. The grafting density results determined by DSC and TGA were similar, with the grafting densities from TGA being 5.6, 6.3, and 23.1% higher than those calculated by DSC for the $Fe_3O_4$, FeCo, and Co MIs, respectfully.

TABLE 2

Grafting Densities of Magnetic Macroinitiators

| Magnetic Core | DSC $\tau_m \times 10^3$ (mol/g) | TGA $\tau_m \times 10^3$ (mol/g) |
| --- | --- | --- |
| $Fe_3O_4$ | 1.8 | 1.9 |
| FeCo | 1.6 | 1.7 |
| Co | 1.3 | 1.6 |

Particle Size and Stability

Particle size of the MIs was determined by DLS and SEM. The DLS results showed that the MIs had a diameter of 112±2.7, 164±4.9, and 142±1 nm, for the $Fe_3O_4$, FeCo, and Co MIs, respectfully. SEM images showed the MI diameters to be approximately 95, 130, and 115 nm for the $Fe_3O_4$, FeCo, and Co MIs, respectfully. As expected, the diameters obtained by DLS are larger than those from the SEM images because DLS measures hydrodynamic diameter. In addition, the SEM images reveal that all the MIs are spherical in shape and have size distributions similar to those obtained by DLS; Co MIs have the least amount of size distribution followed by the $Fe_3O_4$ and FeCo MIs.

Dynamic light scattering was also employed to evaluate the particle stability of the MIs in PBS. Plots of the MIs particle size as a function of time showed that the particle diameter was relatively stable, and after 10 days the particle size only increased by 7.2, 11.5, and 4.2% for $Fe_3O_4$, FeCo, and Co MIs, respectfully. The small growth in particles size indicates aggregation is taking place.

Magnetic Properties

The magnetic properties of the magnetic MIs were measured by means of an alternating gradient magnetometer. Hysteresis curves of each of the MIs were created, and both the $Fe_3O_4$ and Co MIs displayed an almost closed loop while the FeCo MIs displayed a wider loop as compared to the others. From the hysteresis curves, the saturation magnetization ($M_s$), remanent magnetization ($M_r$), magnetic mass susceptibility ($\chi$), and coercivity ($H_c$) can be determined Table 3 shows the obtained values for each MI. $M_s$ is the maximum induced magnetic moment that can be achieved in a magnetic field. $M_r$ is the magnetization still present in the material after removal of an external magnetic field. $\chi$ relates the magnetization of a material to that of the applied magnetic field ($M=\chi H$); $\chi$ is calculated from the initial slope of the magnetization curve. Lastly, $H_c$ is the magnetic field intensity required to lower the magnetization of a material to zero.

TABLE 3

$M_s$, $M_r$, $\chi$, $H_c$ Values for MIs

| | $M_s$ $Am^2$/kg | $M_r$ $Am^2$/kg | $\chi$ $m^3$/kg | $\mu_0 H_c$ mT |
| --- | --- | --- | --- | --- |
| $Fe_3O_4$ | 42.1 ± 2.2 | 139.1 ± 8.6 | 465.5 ± 12.1 | 0.14 ± 5.41 |
| FeCo | 178.3 ± 9.2 | 89.2 ± 7.1 | 188.5 ± 22.1 | 49.7 ± 2.2 |
| Co | 36.1 ± 7.6 | 4.34 ± 0.8 | 345.2 ± 15.4 | 2.7 ± 0.5 |

Bulk Polymerization of Styrene

The ability of the MIs to initiate free radical polymerization was investigated by monitoring the conversion from the bulk polymerization of styrene. The amount of conversion was compared to that obtained by polymerization with pure azo initiator. Conversion was calculated based off the residual styrene remaining and the use of external standards. In ordered to achieve a useful comparison of the MIs, the grafting densities, as obtained by DSC were used to ensure each sample had the same molar concentration of azo initiator. The conversion percent obtained by each MI and that of the pure azo initiator are given in Table 4.

TABLE 4

Percent Conversion of Bulk Polymerized Styrene

| Initiator | Conversion (%) |
| --- | --- |
| Pure Azo initiator | 92.3 ± 2.3 |
| Fe3O4 MI | 72.9 ± 4.3 |
| FeCo MI | 77.5 ± 5.6 |
| Co MI | 83.4 ± 1.7 |

The highest conversion was achieved by the pure azo initiator followed by the Co, FeCo, and $Fe_3O_4$ MIs. The MIs produce a lower conversion percentage due to the fact that the azo initiators are anchored to the surface of the particles. This results in clumps of initiator molecules as opposed to a wide distribution of free initiators. If the initiators are too close to one another, produced free radicals may have a difficult time escaping the cage and initiating polymerization due to the steric effects of the surrounding molecules attached to the particle surface, resulting in the recombination of the free radicals. Alternatively, free radicals that escape the cage, initiate polymerization, and become propagating radicals may undergo subsequent radical-radical termination due to the close proximity of other propagating radicals or recently formed radicals near the particle surface.

Differences in the conversions achieved by the different MIs can be related to the azo initiator grafting density of the particles. The amount of MI particles present is dependent on the grafting density. $Fe_3O_4$ has the highest grafting density per particle, and therefore, the number of particles required to obtain the same molar concentration of azo initiator as the other M is will be less. This can result in a lower distribution on initiator throughout the system, lowering the conversion percentage. Likewise, the FeCo MIs produce a lower percent conversion than the Co MIs due to higher grafting density.

Discussion

Surface modification of MNs is an essential step in producing particles that have stable particle size and magnetic properties. Stable particles are especially important in the biomedical field. If particles begin to degrade and the MN core is revealed, toxicity issues might arise. Furthermore, if the particles aggregate the magnetic properties will be affected. In this study, APTS was used to first modify the magnetic nanoparticles (MNs) in order to provide stable MN dispersions as well as provide anchorage for covalent bonding of specific groups. Once modified with APTS, ACV was grafted onto the anchor.

The stability of the MIs was investigated through suspension of the particles in a PBS solution. All the MIs were quite stable with the FeCo MIs showing the largest amount of aggregation, 11.5% increase in size. Although it would be much better if the particles remained at a constant diameter for a long period of time, in this instance, aggregation is much better than decomposition. Aggregation of the MIs will mainly result in a decrease in initiator efficiency due to the lower distribution of initiating radicals On the other hand, degradation would not only result in the loss of magnetic properties, but degradation products could be released into the surrounding medium. This could result in lowered performance, and in the case of biomedical applications the degradation products could be potentially hazardous to the patients' health.

The magnetic behaviors of MNs, are often different from that of bulky solids due to the MNs finite size effects and microstructures. Investigation of the magnetic properties was performed by means of magnetic hysteresis measurement, and each of the different MIs have completely reversible hysteresis loops at room temperature. The $Fe_3O_4$ MIs shows no hysteresis opening, Co MIs have a slight opening, and the FeCo have a fairly large hysteresis opening as compared to the other MIs. For the $Fe_3O_4$ MI, the Ms was determined to be 42.1±2.2 $Am^2/kg$, which is much lower than that of bulky Fe (222 $Am^2/kg$)[29] and other MNs (212 $Am^2/kg$). The decrease in the Ms of the as prepared $Fe_3O_4$ MIs may be attributed to the decrease in particle size. As particle size decreases, the magnetization also decreases due to an increase in the volume fraction of oxide on the surface of the particle. The oxide layer is a defect on the MN surface which leads to canted (non co-linear) surface moments, decreasing the Ms. In addition, the azo-APTS modification can create a diamagnetic layer that contributes as a non magnetic mass to the total sample volume. Likewise, small particle size and azo APTS modification caused the Co MIs to have a much lower Ms, 36.1±7.6 $Am^2/kg$, than that of bulk Co, 170±8 $Am^2/kg$.

The Ms value of the FeCo MIs, 178.3±9.2 $Am^2/kg$, is lower than that of the bulky FeCo counterparts of 220±5 $Am^2/kg$. As with the $Fe_3O_4$ MIs, the FeCo MIs can have a lower Ms value than the bulk material due to fine particle size and the azo APTS modification. However, due to the larger size of the FeCo MIs as compared to the $Fe_3O_4$ MIs, the variation between the bulk and FeCo MI Ms is not as large. In addition, FeCo MIs can have a low Ms value due to the existence of boron. In the synthesis of FeCo MNs by the coprecipitation method, two mechanisms can be presented, as follows:

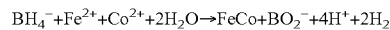

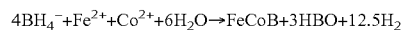

Therefore, if an excess of boron is used, the content of boron in the FeCo MIs will be higher. As a consequence the amount of sodium borohydride used in the synthesis of the MIs was reduced to a minimum. The presence of excess boron can also account for the greater size distribution of the FeCo MIs as compared to the $Fe_3O_4$ and Co MIs.

On the basis of the criteria given by Dunlop, single-domain (SD) particles have a Mr/Ms value larger than 0.5, a value between 0.1 and 0.5 for pseudosingle-domain (PSD) particles, and a value lower than 0.1 for multidomain (MD) particles. The $Fe_3O_4$ and Co MIs display SD behavior with Mr/Ms values of 3.3 and 0.5, respectfully. While the FeCo MI displays PSD behavior and has a Mr/Ms value of 0.12. PSD particles may contain one or two domains, which indicate that the as synthesized FeCo MIs may possess both SD and MD magnetic properties. For MD materials, movement of magnetic domain walls is the main reason for coercivity. While, for SD materials, magnetic domain does not exist and spin flip conversion is the main reason for coercivity. Since the FeCo MIs possess both SD and MD type properties, the coercivity should be higher than those of the $Fe_3O_4$ and Co MIs (SD material). As expected, the Hc for the FeCo MIs (49.7±2.2 mT) was much higher than the Hc values of the $Fe_3O_4$ and Co MIs.

A wide range of uses for magnetic MIs exist, such as in vivo drug delivery, hyperthermia, in vitro separation/selection, and magnetorelaxomtry. Therefore, to meet the specifications of each use, it is important that MNs are produced with the desired functionality and magnetic properties. The MIs synthesized in this study permit one to easily customize the functionality of the MN by grafting functionalized polymer onto the surface via controlled free radical polymerization to create a functional polymer shell around the MI. Magnetic properties can be altered by changing the magnetic core. In addition, the MIs can also be used for bulk polymerization wherein the MIs crosslinked into the system will provide the magnetic properties.

Magnetic macroinitiators were synthesized by modifying magnetic cores with APTS followed by grafting of an azo-initiator (ACV). Grafting of the azo-initiator was confirmed by FTIR, EDAX, DSC, and TGA for all magnetic cores, $Fe_3O_4$, FeCo, and Co. Due to the use of different magnetic cores, it was possible to produce MIs that have the same functional group but possess different magnetic properties. All the MIs were shown to be capable of initiating free radical polymerization, and, as such the MIs can be functionalized or incorporated into a polymer matrix.

Example 2

Magnetically Induced Free Radical Polymerization Using Macroinitiators

To determine the ability of the MIs to initiate free radical polymerization via the application of an external AC magnetic field, various experiments were performed to investigate breakage of the weak bond by means of a calorimetric study as well as a study on the ability of the MIs to initiate free radical polymerization via the application of an external AC MF to different acrylic based systems.

The ability of the MIs to initiate free radical polymerization is compared to the same systems initiated via UV radiation. The amount of conversion, time to cure, and maximum temperature of the polymerized systems is evaluated to compare the two methods. Furthermore, the evaluations are used to compare and contrast the initiating potential of the different magnetic MIs ($Fe_3O_4$, FeCo, Co).

Figure 2:
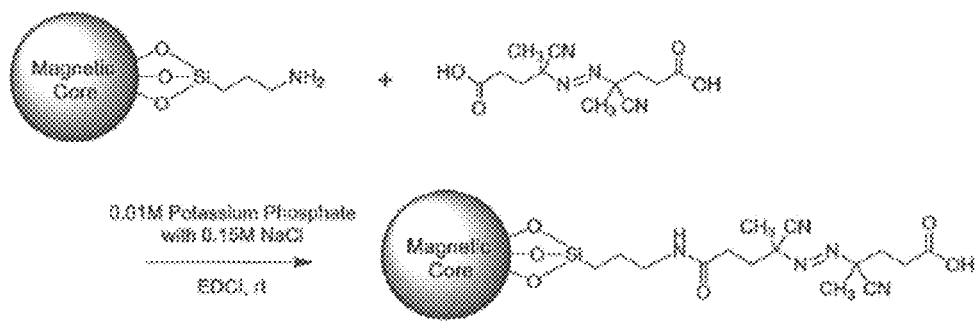
FIG. 2 is a scheme of the synthesis pathway to produce magnetic macroinitiators (MIs) by grafting ACV onto the APTS-modified magnetic particles.

The magnetic MI was synthesized by grafting an azo initiator, 4,4'-azobis(4-cyanovaleric acid), onto the surface of (3-aminopropyl)triethoxysilane modified magnetic nanoparticle, as shown in FIG. 2.

Materials

Lithium bis(trimethylsilyl)amide 97%, diethyl ether, phosphorus trichloride 99%, sulfuryl chloride 97%, Celite® S, phosphorus pentachloride ≥98.0%, dichloromethane, L-phenylalanine ethyl ester hydrochloride 99%, tetrahydrofuran anhydrous ≥99.9%, triethylamine ≥99%, 2-aminoethyl methacrylate hydrochloride 90%, N,N dimethylformamide anhydrous 99.8%, methyl methacrylate ≥98.5%, styrene, phosphate buffered saline (PBS), and Real Crystal® IR sample Cards with cover slips were purchased from Sigma. Aliphatic urethane diacylate oligomer (CN981) and difunctional bisphenol A epoxy acrylate oligomer (CN 120Z) were obtained from Sartome!'. Photoinitaiators Iragacure 184 and Jragacure 2959 were obtained from Ciba Specialty Chemicals. $Fe_3O_4$, FeCo, and Co magnetic macro-initiators were obtained from previous synthesis work described in Example 1, above.

Synthesis of Biocompatible Acrylic Polyphosphazene

Biocompatible, acrylic functional polyphosphazene was synthesized by reacting poly(dichlorophosphazene) with phenylalanine and aminoethyl methaclylate. All manipulations were carried out using standard Schlenk techniques under nitrogen atmosphere. For the preparation of poly (dichlorphospahzene), the precursor, Cl3P=NSiMe3, was first synthesized. A suspension of LiN(SiMe3)2 (0.033 mol) in 100 mL of Et2O (diethyl ether) was cooled to 0° C. Fresh distilled PCl3 (2.88 mL, 0.033 mol) was then added dropwise over 30 min while the solution was continuously stirred. The solution was then allowed to warm to room temperature and stirred for an additional 1 h. Next, the solution was cooled to 0° C. followed by the dropwise addition of fresh distilled S02Ch (2.68 mL, 0.033 mol) over 30 min. The solution was stirred for 1 h at 0° C., followed by 30 min of stirring at room temperature. The solution was then filtered through a 1 cm layer of Celite followed by concentration of Cl3P=NSiMe3 through the removal of volatiles by vacuum distillation. To a stirred solution of the Cl3P=NSiMe3 (1.0 g, 4.4 mol) in 35 mL $CH_2Cl_2$, a solution of PCl5 (8 mmol) in 10 mL CH2Cl2 was added. The reaction mixture was stirred at room temperature for 24 h followed by the removal of volatiles by vacuum distillation. Yield of poly(dichlorophazene) was 83%. $^{31}$P NMR: δ=−17.5 ppm (—N=P(Cl2)-).

The biocompatible, acrylic functionalized polyphosphazene was synthesized as follows: phenylalanine ethyl ester hydrochloride (2.76 g, 12.01 mmol) was suspended in dry THF (60 mL) containing triethylamine (1.84 g, 18.15 mmol) and was added slowly to a solution containing poly(dichlorophosphazene) (1.0 g, 8.62 mmol) and dry THF (50 mL). The reaction mixture was stirred for 8 h at −60° C. followed by stirring for an additional 48 h at room temperature. Next, a solution of 2-aminoethyl methacrylate hydrochloride (1.71 g, 10.34 mmol), anhydrous DMF (10 mL), and triethylamine (2.01 g, 20.68 mmol) was added to the reaction mixture. The mixture was stirred for 24 h at room temperature followed by 24 h at 40° C. The reaction mixture was filtered and concentrated by vacuum distillation. Yield of the biocompatible, acrylic functionalized polyphosphazene was 68% Mn from GPC: 3140 with PDI 2.7. $^{31}$P NMR ($CDCl_3$, δ, ppm) 1.3. $^1$H NMR ($CDCl_3$, δ, ppm): 1.1 (3H, P—NH—CH(CH2-Ar)—COO—CH2CH3), 1.9 (3H, CH2=C(CH3)- of AEMA), 3.1 (2H, —NH—CH2CH2- of AEMA), 4.0 (2H, P—NH—CH(CH2-Ar)—COO—CH2CH3), 4.4 (2H, P—NH—CH(CH2-Ar)—COO—CH2CH3 and —NH—CH2-CH2- of AEMA), 4.8 (1H, P—NH—CH(CH2-Ar)—COO—CH2CH3), 6.5 (1H, CH2]=C(CH3)- of AEMA), 6.7 (1H, CH2=C(CH3)- of AEMA), and 7.7 (5H, P—NH—CH (CH2-Ar)—COO—CH2CH3).

Calorimetery Study of Magnetic Macro-Initiators

Calorimetry traces of the magnetic MIs under the influence of an AC MF were obtained by measuring the change in temperature of an MI solution. To determine the exotherm resulting for the decomposition of the azo group of the magnetic MI due to the application of an AC MF, the temperature change was monitored as a function of time during exposure to an externally applied MF. Temperature change was monitored for both a water/MI solution and that of a water/pre-azo grafted magnetic particle (silica modified magnetic particle). The heat flow was determined according to the following equation (2):

$$q = mC_p \Delta T \qquad (2)$$

where m is the mass of solution, Cp is the specific heat capacity of the solution (in this case that of water), and ΔT is the temperature difference between the water/MI solution and the water/pre-azo grafted magnetic particle solution. The temperature difference between the pre-azo grafted and azo grafted magnetic particles permits for the determination of the temperature increase resulting for the decomposition of the azo group as opposed to the temperature increase resulting from power dissipation of magnetic particles in an AC MF.

Figure 3:
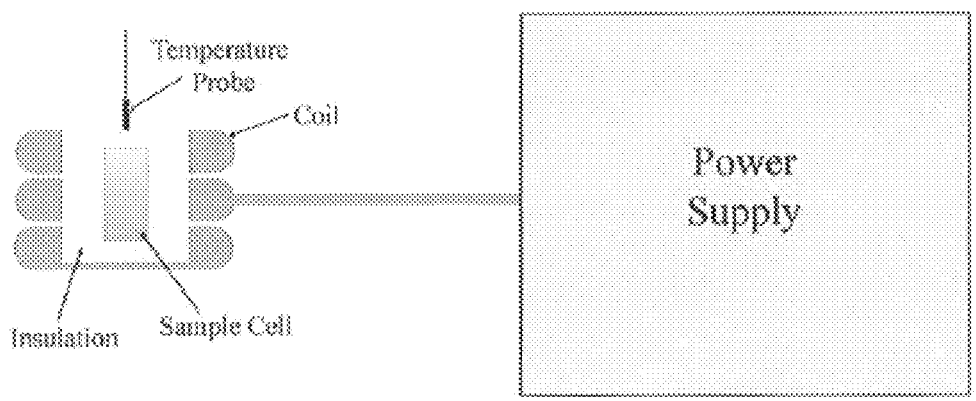
FIG. 3 is a schematic of the calorimeter setup employed for the calorimetry study of Example 2 herein.

In a 10 mL glass vial, 0.1 g of $Fe_3O_4$ MIs were suspended in 2 mL of deionized water, creating a 5 wt. % solution. The glass vial was then place in an insulated holder surrounded by an electromagnetic coil. An IR temperature sensor was placed over the top of the vial to measure the temperature change of the solution during application of an AC MF. FIG. 3 shows a depiction of the instrument setup. The AC MF was applied for up to 3 min, during which the temperature was continuously monitored. The AC MF for this experiment and all subsequent experiments was supplied by an circular copper coil (50 mm ID, 5 turns) attached to a RF generator (MSI automation, USA) operating a fixed frequency of 480 kHz and a 12 kA/m magnetic field. The same procedure was repeated for each of the MIs (FeCo and Co) and their respective pre-azo grafted magnetic particles. The obtained temperature readings were then used in conjunction with the above equation to determine the heat flow for each of the magnetic MIs.

Magnetically Induced Free Radical Polymerization

Magnetically induced free radical polymerization was investigated by mixing various acrylic systems with magnetic MI and placing the sample in an AC MF. During exposure to the AC MF, polymerization was monitored by recording the FTIR spectrum of the sample every 5 sec. In addition, the temperature of the system was continuously monitored with an IR temperature sensor. The conversion as a function of time was then calculated by use of the following equation (3):

$$\text{Conversion (\%)} = \frac{A_0 - A_t}{A_0} \times 100\% \quad (3)$$

where $A_0$ is the peak area at time zero and $A_t$ is the peak area at time t. For polymerization of all the acrylic samples, the change in peak area of the C=C stretch, 1640-1660 cm$^{-1}$, was used to calculate the conversion. In addition to magnetic initiation, conversion as a function of time was determined for the photopolymerization of each acrylic system.

Free radical polymerizable acrylic systems include: styrene, aliphatic urethane acrylate mixed with 30 wt. % methyl methacrylate, difunctional bisphenol A epoxy acrylate with 30 wt. % styrene, and the synthesized biocompatible acrylic polyphosphazene. UV initiation of the urethane and epoxy systems was initiated with 2 wt. % of the photoinitiator Iragacure 184. Magnetic initiation was initiated with 10 wt. % magnetic MI ($Fe_3O_4$, FeCo, or Co). For the biocompatible acrylic polyphosphazene system, the polymer (60 wt. %) was dissolved in PBS (38 wt. %) and mixed with 2 wt. % photoinitiator Iragacure 2959 for UV initiation and 10 wt. % magnetic MI ($Fe_3O_4$, FeCo, or Co) for magnetic initiation.

For the UV initiation study, samples were placed onto a disposable KBr IR card and covered with a KBr cover slip. The KBr card was then placed in the path of the IR beam and initiation using a LESCO Super Spot MK II UV curing system. UV radiation was introduced at a distance of 5 cm for the KBr cover through a flexible optical fiber. The radiation intensity was determined to be 10.8 mW/cm2 by means of a UVX digital radiometer. FTIR spectra were collected on a Nicolet 380 FT-IR spectrometer at a resolution of 4 cm$^{-1}$ and at a rate of 1 spectra every 0.5 s. All UV initiation experiments were ran in triplicate with the mean and standard deviation reported.

As for the magnetic initiation, samples were place on disposable KBr IR card and covered with a KBr cover slip. The KBr card was then placed inside the magnetic coil and exposed to a 12 kA/m and 480 kHz MF. The setup is similar to that show in FIG. 3 except there is no insulation and the sample cell is replaced by the KBr card. For each sample, FTIR spectra were collected before exposure to any MF followed by spectra collection for every 5 s of exposure to the AC MF, FTIR spectra were collected at a resolution of 16 cm$^{-1}$. All magnetic initiation experiments were run in triplicate with the mean and standard deviation reported.

The same procedure for the magnetic initiation experiments was repeated for the epoxy and urethane systems, but the concentration of MI was continually increased until the highest conversion was achieved without having the temperature increase beyond 45° C. All magnetic initiation experiments were run in triplicate with the mean and standard deviation reported.

Characterization $^{31}$P NMR and $^1$H NMR spectrums were recorded in a Varian Mercury 300 MHz spectrophotometer. All the NMR spectra were measured by dissolving the samples in CDCl3.

Molecular weight and molecular weight distribution of the biocompatible acrylic polyphosphazene was determined with a Waters OPC instrument equipped with Waters HR4 and HR2 styragel columns, a Waters differential refractometer and a Viscotek 760 A dual light scattering and viscosity detector. Samples were dissolved in THF and the flow rate was 1 mL·min$^{-1}$. Polystyrene was used as the calibration standard.

The glass transition temperature of each system was measured on a TA inst\'llment DSC Q200 model. Samples were heated from −30 to 150° C. at a heating rate 10° C.·min$^{-1}$ under nitrogen atmosphere.

Results

Magnetic MIs synthesized in Example 1 were tested to determine if it was possible to decompose the azo weak link and initiate free radical polymerization through application of an AC MF. The feasibility of magnetically induced polymerization was investigated thorough MD simulations and experiments. The MD simulation was used to determine if the azo bond could be broken through application of force to the magnetic core. In addition, the MD simulation was used to calculate the minimum required force applied to the magnetic core to break the azo bond.

Figure 4:
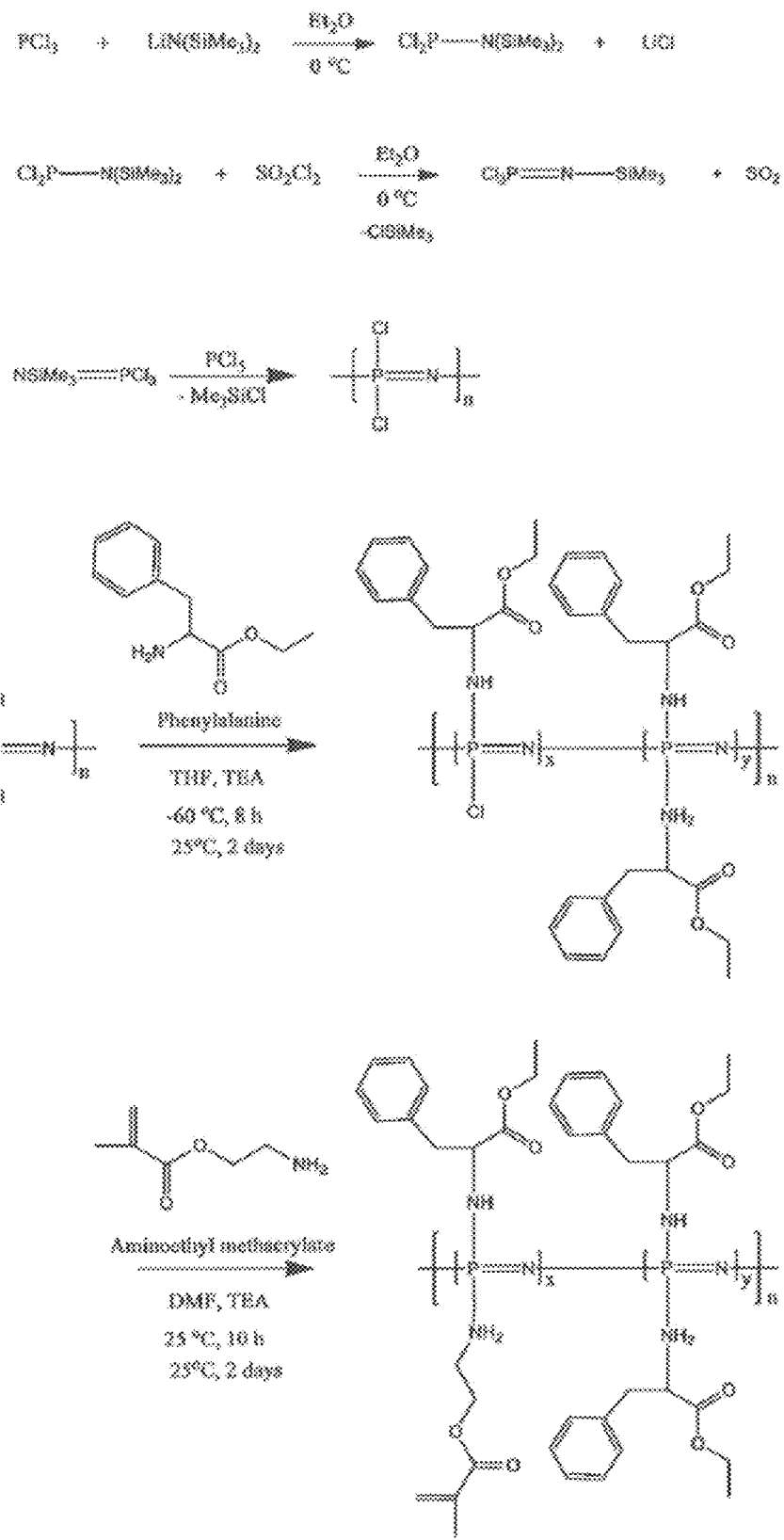
FIG. 4 shows the synthesis of biocompatible acrylic polyphosphazene.

Experimentally, magnetically induced polymerization was investigated by polymerizing three different acrylic systems with the synthesized magnetic MIs. The first system was an acrylic epoxy, the second was a urethane diacrylate, and the last was a biocompatible acrylic system. A biocompatible system was chosen due to the huge potential magnetic MIs have in the biomedical field. For the biocompatible system, an acrylic polyphosphazene was synthesized by reacting poly(dichlorophosphazene) with an amino acid ester (phenylalanine) and aminoethyl methacrylate, FIG. 4.

Figure 5:
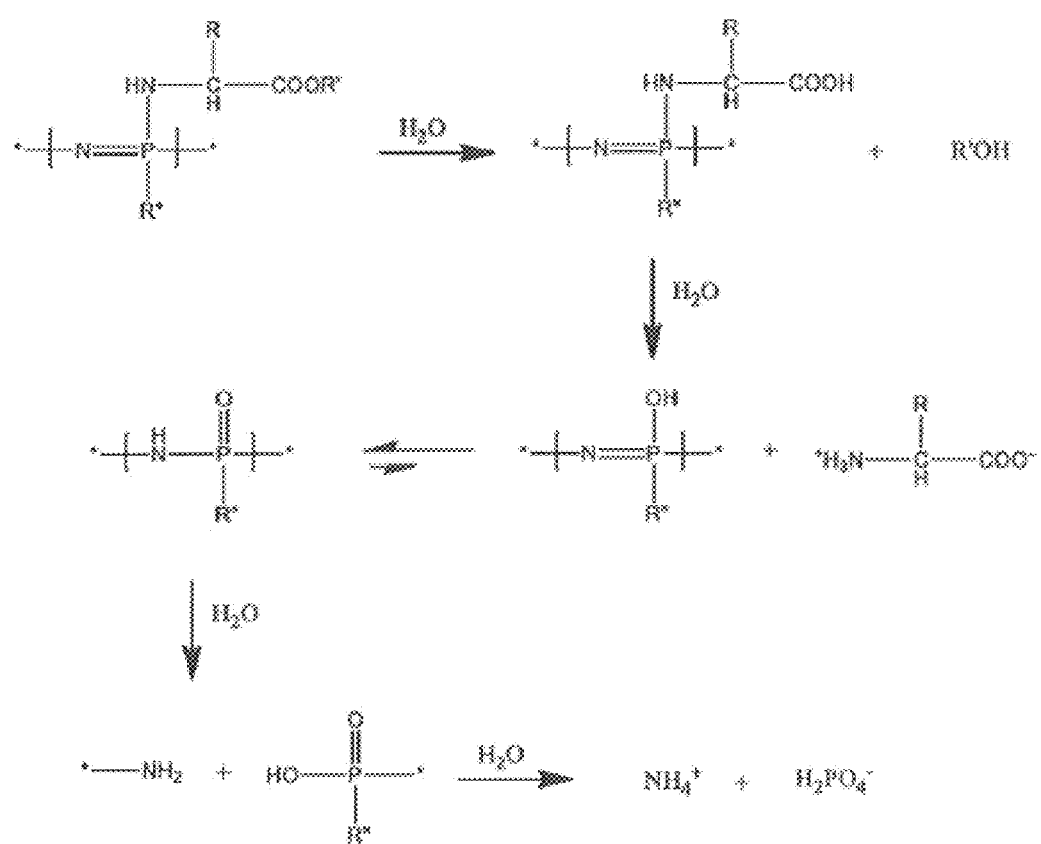
FIG. 5 shows the degradation of polyphosphazene.

Polyphosphazenes containing amino acid ester side groups are ideal biomaterials due to their ability to hydrolytically degrade at biological pH into nontoxic products. Furthermore, amino acid esters substituted polyphosphazene degrades to form an ammonium phosphate buffering system that maintains a neutral pH, highly beneficial for biological applications. FIG. 5 shows the degradation of an amino acid ester substituted polyphasphazene. Phenylyalinine was chosen as the amino acid ester because it provides a polymer with a Tg higher than body temperature, which is important for bone tissue engineering.

It is anticipated that the grafted azo bond will decompose upon application of an AC MF without the buildup of deleterious heat. As such, the temperature of the acrylic systems were monitored during magnetically induced polymerization. Furthermore, decomposition of the azo bond under the influence of an externally applied AC MF was investigated through calorimetery studies Calorimetric Study Each magnetic MI shows an exotherm that is below the thermal decomposition temperature of the pure 4,4'-Azobis-4-cyanovaleric acid initiator, 110° C. The Co MIs display an exotherm at the lowest temperature, 32.3° C., followed by the FeCo and $Fe_3O_4$ MIs at 37.8 and 39.1° C., respectfully.

Magnetic and UV Initiated Free Radical Polymerization

Magnetically induced free radical polymerization was investigated by polymerizing different acrylic systems with three different MIs through the application of an AC MF. The efficiency of magnetic initiation was compared to that of UV. Initiation efficiency was determine by measuring the amount of conversion, induction time, and time to max conversion through use of real-time FTIR to monitor the absorbance of the C=C bond. All samples showed similar graphs, with the C=C absorbance decreasing during exposure to external stimuli. A list of conversion, induction time, time to max conversion, and temperature at max conversion for each type of initiation during the polymerization of each acrylic system is shown in Table 5. The Co M is have the fastest induction time followed by the FeCo and $Fe_3O_4$ MIs. Conversion is highest with UV initiation followed by magnetic initiation with Co, FeCo, and $Fe_3O_4$ MIs. For a given system, the maximum temperature achieved is the lowest for UV initiation followed by Co, FeCo, and $Fe_3O_4$ MIs. For magnetic initiation, the maximum temperature increases as the exposure time to the AC MF (time to max conversion) increases.

As seen in Table 5, using only 10 wt. % of the MIs for magnetic initiation results in lower than desired conversion percentages. To help increases the conversion percentage, the wt. % of MI was continually increased until a maximum conversion was achieved without causing the temperature of the system to increase above 45° C. The temperature limit of 45° C. was chosen because tltis temperature will only cause minimal damage to normal tissues, while higher temperatures can result in sever tissue damage. Table 6 lists the concentration of each MI required to get the highest conversion without out exceeding a system temperature of 45° C. The polyphosphazene system is not listed in Table 6 because higher conversion than those listed in Table 5 could not be obtained. This is due to the fact that the acrylic polyphosphazene is dispersed in PBS solution which limits the amount on interactions the magnetic MIs have with the polymer. As for the other acrylic systems, the concentration of the MIs had to be greatly increased to get higher conversions. However, since the temperature rise of the system is dependent on the concentration of MI, no more Ml could be added to the system to produce higher conversions without causing the temperature to increase beyond 45° C.

TABLE 5

List of conversion, induction time, time to max conversion, and temperature at max conversion during polymerization of different acrylic systems for either IN or magnetic initiation (10 wt. % MI)

| Sample | Initiator | Induction Time (sec) | Time to Max Conversion (sec) | Maximum Conversion (%) | Temperature at Max Conversion (° C.) |
|---|---|---|---|---|---|
| Acrylic Urethane | UV | 0 | 2.5 | 93 ± 2 | 29.5 |
| — | Fe | 60 | 130 | 50 ± 3 | 35.7 |
| — | FeCo | 50 | 115 | 52 ± 5 | 34.1 |
| — | Co | 35 | 90 | 60 ± 3 | 31.2 |
| Acrylic Epoxy | UV | 0 | 2.5 | 91 ± 2 | 29.2 |
| — | Fe | 60 | 135 | 49 ± 4 | 37.5 |
| — | FeCo | 50 | 115 | 50 ± 7 | 34.2 |
| — | Co | 35 | 90 | 58 ± 2 | 32.5 |
| Polyphosphazene | UV | 0 | 3.5 | 72 ± 3 | 27.4 |
| — | Fe | 75 | 150 | 40 ± 5 | 40.5 |
| — | FeCo | 60 | 150 | 43 ± 8 | 38.8 |
| — | Co | 40 | 120 | 52 ± 4 | 33.7 |

TABLE 6

Amount of MI Required to Reach Maximum Conversion During Magnetic Initiation

| Sample | Initiator | Initiator Concentration (wt. %) | Conversion (%) | Maximum Temperature (° C.) |
|---|---|---|---|---|
| Acrylic Urethane | Fe | 32 | 67 ± 3 | 45 |
| — | FeCo | 30 | 69 ± 5 | 45 |
| — | Co | 25 | 77 ± 2 | 39 |
| Acrylic Epoxy | Fe | 32 | 65 ± 4 | 45 |
| — | FeCo | 30 | 67 ± 6 | 45 |
| — | Co | 25 | 79 ± 3 | 41 |

To determine the effect the MIs have on the polymerized acrylic systems, the Tg of each sample was determined Table 7 list the Tg of each polymerized system that had highest conversion. As expected the polymerized systems initiated by UV radiation produced the material with the highest Tg. The magnetically initiated samples have a lower Tg due to lower conversion. However, the Tg of the magnetically polymerized material is greater t!Jan same material polymerized by UV to the same conversion percentage. This is because in order to magnetically polymerize the sample, magnet MIs need to be added to the system. As more MI is added to the system, the mobility of the polymer chains decrease due to greater bonding between the polymer chains and the magnetic particles. Since the number of bonding sites between polymer and magnetic particles is dependent on the concentration of MI, more MI leads to more bonds which results in lower chain mobility.

TABLE 7

Glass Transistion Temperatures of the Different Acrylic Systems Polymerized by Either UV or Magnetic Initiation

| Sample | Initiator | $T_g$ (° C.) |
|---|---|---|
| Acrylic Urethane | UV | 39.3 ± 0.9 |
| — | Fe | 25.4 ± 2.5 |
| — | FeCo | 26.6 ± 3.4 |
| — | Co | 31.4 ± 1.8 |
| Acrylic Epoxy | UV | 54.2 ± 1.2 |
| — | Fe | 28.4 ± 1.8 |
| — | FeCo | 30.9 ± 2.4 |
| — | Co | 37.3 ± 1.1 |
| Polyphospahzene | UV | 69.8 ± 2.8 |
| — | Fe | 54 ± 3.3 |
| — | FeCo | 53.5 ± 4 |
| — | Co | 56.1 ± 2.2 |

Discussion

Figure 6:
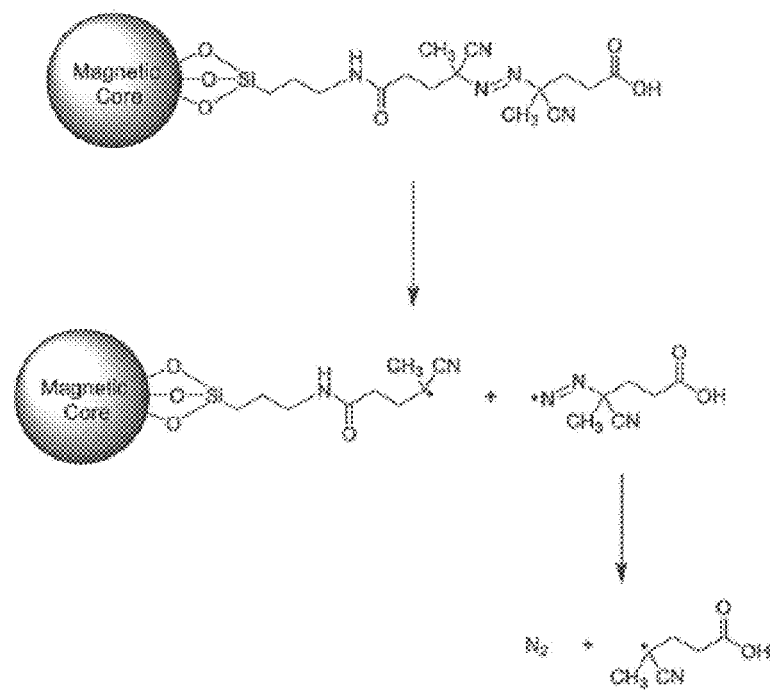
FIG. 6 shows the stepwise decomposition of exemplary azo-containint MIs in accordance with this invention.

Azoalkanes (RN=NR') dissociate into two alkyl radicals and an N2 molecule. Evidence for the decomposition of azo compounds suggests that the reaction proceeds through a stepwise mechanism as opposed to a concerted one. Due to the fact that this is a stepwise decomposition, only the C—N bond of the azo group closest to the magnetic core was monitored for cleavage. This ensures that the calculated force needed to decompose the azo group will be at minimum since, due to energy dissipation, more energy would be needed to break bonds that are farther from the point of applied force. The stepwise mechanism for the decomposition of the MI, grafted azo compound on a magnetic particle, is shown in the scheme of FIG. 6.

Figure 7:
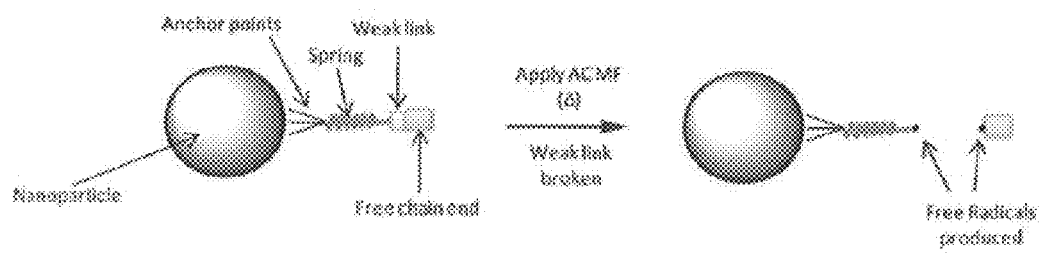
FIG. 7 provides a depiction of the MIs as a spring.

Upon application of a force to the magnetic MI, energy will be transfer through the grafted molecule to the weak link. Once enough energy has been transferred, the weak link will break. By modeling the grafted molecule from anchor point to weak link as a spring, Hooke's law (F=−kx) can be used to determine the spring constant, k. FIG. 7 shows a depiction of the grafted initiator molecule as a spring. Assuming that all other bonds comprising the molecule have negligible change in bond length as compared to the weak C—N bond, k can be calculated by setting x equal to the displacement of the bond (Dmax−$r_0$) and F to 62 kcal/mol·A. Substitution of these into Hooke's law gives a spring constant of 111.5 kcal/mol.

Figure 8:
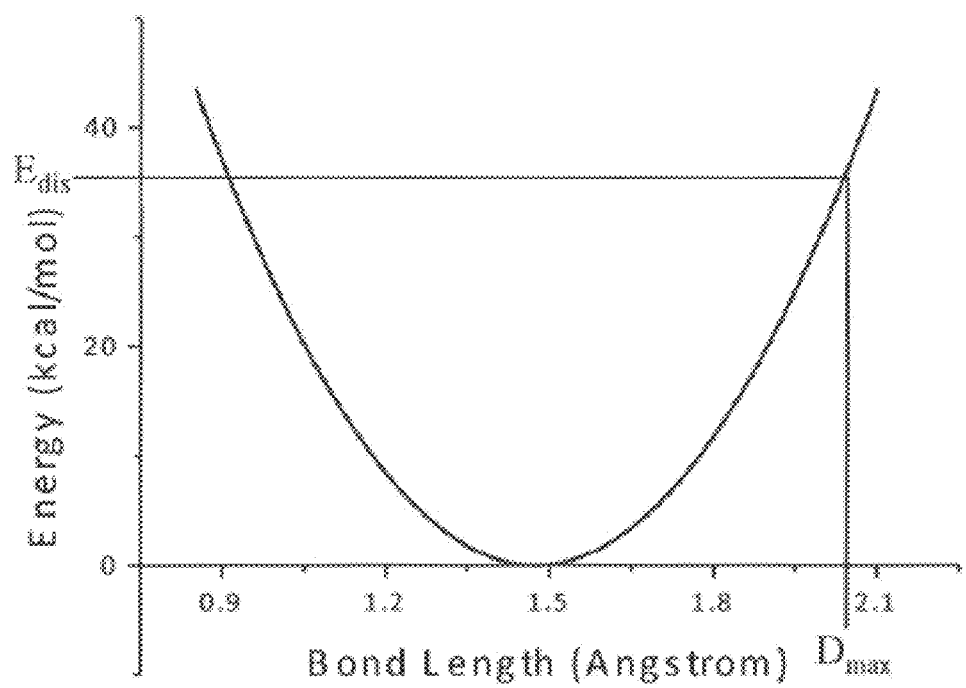
FIG. 8 is a graph showing the harmonic potential of the C—N bond in an azo group.

The Harmonic bond potential of the C—N bond can be given by following equation, $$V_B = k(r_{ij} - r_o)^2 \tag{4}$$

where k is the force constant, $r_0$ is the reference bond length (1.474 Å), and $r_{ij}$ is the distance between atoms C and N. Substitution of the value for k and $r_0$ into this equation gives the harmonic potential curve shown in FIG. 8. Use of Dmax with this equation results in a C—N bond dissociation energy of 34.5 kcal/mol. The dissociation energy of a C—N bond is reported as 70 kcal/mol, which is much higher than that obtained in this study. However, the value of 34.5 kcal/mol corresponds very closely to that of the reported energy of activation, 34 kcal/mol, for cleavage of azo C—N bonds and formation of free radicals. The activation energy is much lower that the C—N bond dissociation energy because when the C—N bonds of the azo group contained within the MI break, a very stable N2 molecule is formed which is energetically favorable. Due to closeness of the calculated dissociation energy to that of the reported energy of activation, it is reasonable to report the minimum force required to break the weak link of the azo group as 62±2 kcal/mol·Å.

The 62 kcal/mol·Å of force will be applied by means of an AC MF. The magnetic field, H, required to impose the 62 kcal/mol·Å of force onto the magnetic core can be calculated from the following equation:

$$F_m = \mu_o V_p M_p \cdot \nabla H \quad (5)$$

where $F_m$ is the magnetic force on a particle, $\mu_0$ to is the permeability of free space, Vp is the volume of the particle, and Mp is the volumetric magnetization of the particle. The volumetric magnetization, Mp, can be given by Mp=ΔχH, where $\Delta\chi = \chi_p - \chi_s$; $\chi_p$ is the volume magnetic susceptibility of the magnetic particle and $\chi_s$ is the volume magnetic susceptibility of the surrounding medium. Substituting ΔχH for Mp and neglecting $\chi_s$ due to its negligible value as compared to $\chi_p$, equation (5), gives the following equation:

$$F_m = \mu_0 V_p \chi_p H \cdot \nabla H \quad (6)$$

Using equation (6), in combination with the obtained minimum force of 62 kcal/mol·Å, the minimum magnetic field strength required to break the C—N bond of the azo group can be calculated for each of the MIs. Table 8 lists the calculated magnetic field strength (H) for each of the MIs. The volume of each particle was calculated by averaging the obtained particles diameters from DLS and SEM. The volumetric susceptibility, $\chi_p$, was calculated by multiplying the mass susceptibility $\chi$ by the density of the magnetic cores (p=5.18×10³, 4907, and 8900 kg·m⁻³ for Fe₃O₄, FeCo, and Co respectfully). Particle diameters and values of $\chi$ in Example 1.

TABLE 8

Calculated Magnetic Field Strength Required to Break the C—N Bond for Each Type of MI

| Magnetic Initiator | H (kA/m) |
|---|---|
| Fe₃O₄ | 11.15 |
| FeCo | 10.01 |
| Co | 5.56 |

Figure 9:
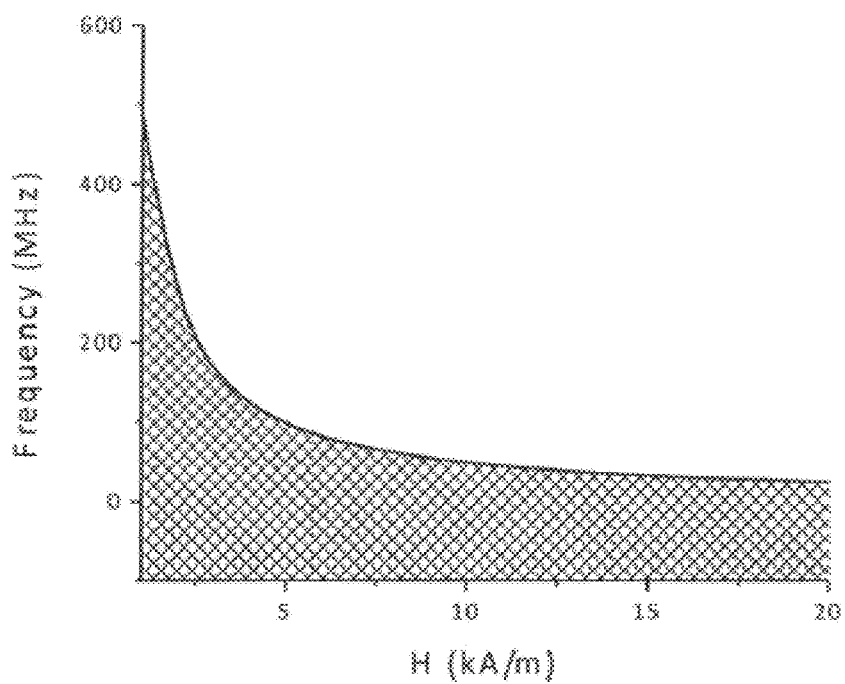
FIG. 9 is a graph showing the frequency dependence of magnetic field strength (H) for the safe operating conditions for an AC MF.
Figure 10:
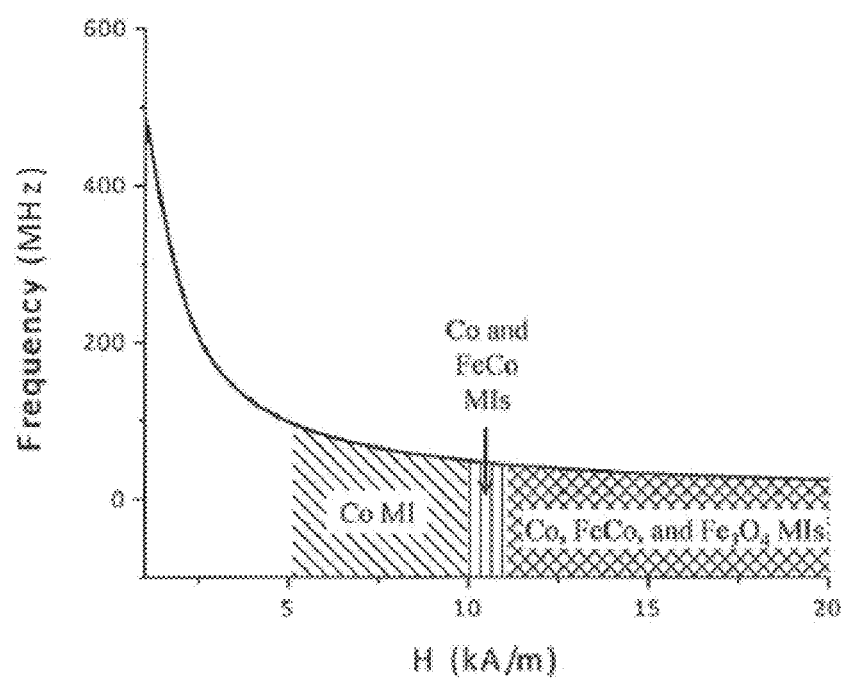
FIG. 10 is a graph showing the safe operating conditions for exemplary MIs of this invention.

According to equation (6), any applied H above that listed in Table 8 will provide enough force to the MI core to make it possible for the azo group to decompose into free radicals. However, high field strengths and frequencies can result in harmful physiological responses. Therefore, the operating region of the electromagnet should be chosen such that the product H·f is below the threshold value of 4.85×10⁸ A m⁻¹ s⁻¹ allowable for humans. This operating region must be used for magnetically induced polymerization in biomedical applications and should be used for alternative applications to ensure the safety of the operator. FIG. 9 shows safe operation conditions over a wide range of magnetic fields and FIG. 11 shows the safe operation condition for the different MIs. It can be seen from FIG. 10 that the operating condition employed in this study, 480 kHz and a 12 kA/m magnetic field, is contained within the safe operating region.

Magnetic Initiation

When compared to UV initiation, magnetically induced polymerization is much slower. This is expected since decomposition of the photoinitiator occurs almost immediately when exposed to a sufficiently strong UV light source. The MI decomposes once sufficient energy is transferred from the magnetic core to the attached weak link. Therefore, since this is not a direct excitation of the weak link, as with photopolymerization, the induction time or time to decomposition is longer than photopolymerization.

The difference in induction time between the different MIs, is due to the different magnetic susceptibilities, $\chi_p$ of the MIs. Co MI has the highest $\chi_p$ and as a result will experience the greatest amount of magnetic force compared to the other MIs, as determined by equation (6). Although frequency is not a variable in equation (6), the application of a high frequency is required to keep the MIs evenly dispersed throughout the medium. Without alternating the magnetic field, the MIs would collect and aggregate at the edges of the polymerizaiton vessel. Without good dispersion of the MIs, the total conversion would be greatly reduced if not completely hindered in the center where no free radical initiating species are present. Furthermore, by alternating the magnetic field, the MIs are able to rotate within the medium. Rotation of the MI particle is important with the intention that each of the attached weak links experiences the same amount of magnetic force and decompose all within a similar time frame.

Conversion of the acrylic system was much greater with UV initiation rather than with magnetic initiation. This is likely due to the fact that the azo groups attached to the magnetic core do not all feel the same amount of force, resulting in incomplete decomposition of each azo group, lowering the conversion. To better promote free radical polymerization, the concentration of the MI was raised from 10 wt. % to 32, 30, and 25 wt. % for the Fe₃O₄, FeCo, and Co MIs, respectfully. This increase in the MI concentration resulted in an approximate 73% increase in conversion. The order of highest to lowest MI concentration is expected due to the same ordering of the required minimum magnetic field to break the C—N bond of the azo group, Fe₃O₄>FeCo>Co. Greater conversion percentage may have been achievable, but the MI concentration could not be raised further without exceeding the 45° C. temperature limit preventing detrimental tissue damage.

During the magnetically induced polymerization of the samples, the temperature of the system was continuously monitored. As seen in Table 5, the highest temperatures recorded were when the Fe₃O₄ MIs were used. As aforementioned, the Fe₃O₄ MIs require a longer time since the $\chi_p$ is the lowest and consequently it takes a longer time to transfer enough energy to break the C—N bond of the azo group. Therefore, the temperature of the system has a longer time to increase due to the heat of reaction and power dissipation of the magnetic MIs. Application of an AC MF can result in the production of deleterious heat due to power dissipation of the magnetic particles. The power dissipation or heat generation, can be calculated from equation (7).

$$P = \pi\mu_0\chi_0 H^2 f \frac{2\pi f \tau}{1+(2\pi f \tau)^2} \quad (7)$$

where f is the frequency and τ is the effective relaxation time. Since the purpose of magnetically induced polymerization is to produce free radical polymerization within an enclosed area without the application of heat, it is important that the AC MF not be applied for an extended period of time. According to equation (7), the power dissipation is dependent on the magnetic field strength and the frequency. As a result, the AC MF needs to be removed before such time as large amounts of heat are produced. This is extremely important in biomedical applications where high heat can kill surrounding tissue and any other application where the surrounding medium is heat sensitive.

In order to have safe and effective magnetically induced polymerization, both the concentration of the M is used and the duration of the AC MF need to be carefully controlled. If the MI concentration is too low, not enough free radicals will be formed and the ultimate conversion will be low. On the other hand, if the MI concentration is too high, deleterious heat will be quickly built up, resulting in harmful effects when used in conjunction with biomedical applications. As for the duration of the externally applied AC MF, short exposure times results in insufficient decomposition of the initiator and formation of free radicals, while long exposure can result in production of unwanted high levels of heat.

What is claimed is:

1. A method of initiating chain reaction comprising:
   providing a chain reaction medium including:
   (a) a macroinitiator including: a multidentate anchor segment coordinated with a magnetic nanoparticle through more than one bond, and
   a chain reaction initiator segment bound to the multidentate anchor segment and providing a weak bond that can be cleaved to initiate a chain reaction; and
   (b) chain reactants selected from monomers, reactive oligomers, reactive diluents and derivatives thereof and mixtures of the forgoing; and
   subjecting the chain reaction medium to an alternating current magnetic field to vibrate the magnetic nanoparticle and thereby cleave the weak bond, the cleavage resulting in the initiation of a chain reaction involving the chain reactants.

2. The method of claim 1, wherein the magnetic nanoparticle is formed from ferromagnetic materials.

3. The method of claim 2, wherein the magnetic nanoparticle is selected from magnetite, iron, cobalt, and iron-cobalt complexes.

4. The method of claim 2, wherein the magnetic nanoparticle has a diameter of less than 250 nm.

5. The method of claim 1, wherein the multidentate anchor segment is formed from a multidentate anchor compound by coordinating the multidentate anchor compound to the magnetic nanoparticle.

6. The method of claim 5, wherein the multidentate anchor compound is selected from alkoxysilane coupling agents.

7. The method of claim 6, wherein the multidentate alkoxysilane coupling agents are selected from dimethoxysilanes, trimethoxysilanes, diethoxysilane, triethoxysilane.

8. The method of claim 5, wherein the multidentate anchor compound is biocompatible.

9. The method of claim 5, wherein the chain reaction initiator segment is formed from a chain reaction initiator compound by binding the chain reaction initiator compound to the multidentate anchor segment or the multidentate anchor compound.

10. The method of claim 9, wherein the chain reaction initiator compound is selected from azo compounds, peroxides and derivatives thereof and mixtures of the forgoing.

11. The method of claim 9, wherein the chain reaction initiator compound is an azo compound selected from 4,4'-azobis(4-cyanovaleric acid) and azobisisobutyronitrile (AIBN) and derivatives thereof and mixtures of the forgoing.

12. The method of claim 9, wherein the chain reaction initiator compound is a peroxide compound selected from di-tert-butyl peroxide, benzoyl peroxide, methyl ethyl ketone peroxide, acetone peroxide, and derivatives thereof and mixtures of the forgoing.

13. The method of claim 1, wherein the weak bond provided by the chain reaction initiator segment has a bond strength of 65 kcal/mol or less.

14. The method of claim 1, wherein the chain reactants are selected from multifunctional vinyl reactive diluents, vinyl-containing monomers and reactive oligomers, wherein the reactive oligomers have chain end vinyl functionality or internal vinyl functionality or pendant vinyl functionality.

15. The method of claim 14, wherein the chain reactants include vinyl-containing monomers selected from acrylates, methacrylates and styrene and derivatives thereof and mixtures of the foregoing, and the chain reaction involves polymerization of the vinyl-containing monomers.

16. The method of claim 14, wherein the chain reaction medium further includes one or more of solvents, curing agents, and sulfur-containing compounds.

17. The method of claim 1, wherein, in said step of subjecting the chain reaction medium to an alternating current magnetic field, bond cleavage of the weak bond is achieved without the generation of heat sufficient to cause thermal decomposition of the weak bond.

18. The method of claim 1, wherein, in said step of subjecting the chain reaction medium to an alternating current magnetic field, the temperature of the chain reaction medium stays below a thermal decomposition temperature of the weak bond.

19. An initiator for chain reactions comprising:
    a magnetic nanoparticle core;
    an anchor segment coordinated with said magnetic nanoparticle core through more than one bonded atom;
    a chain reaction initiator segment linked to said anchor segment, wherein the magnetic nanoparticle core is selected from magnetite, iron, cobalt, and iron-cobalt complexes, the anchor segment is formed from an alkoxysilane coupling agent and the chain reaction initiator segment is formed from 4,4'-azobis(4-cyanovaleric acid) and azobisisobutyronitrile (AIBN) and derivatives thereof.

20. The initiator of claim 19, wherein the alkoxysilane coupling agent is (3-aminopropyl)triethoxysilane and the chain reaction initiator segment is formed from 4,4'-azobis (4-cyanovaleric acid).

* * * * *